United States Patent

Kasahara et al.

[11] Patent Number: 5,838,381
[45] Date of Patent: Nov. 17, 1998

[54] IMAGE DISPLAY APPARATUS CAPABLE OF DISPLAYING PERSONAL COMPUTER SIGNALS AND TELEVISION SIGNAL BY CONVERSION INTO A SIGNAL OF A HIGHER NUMBER OF PIXELS

[75] Inventors: Yasuhiro Kasahara; Takaaki Matono, both of Yokohama; Koichi Sudo, Fujisawa; Makoto Kitamura, Yokohama; Yasuhiro Tomita, Yokohama; Kouichi Sugimoto, Yokohama; Toshihiko Matsuzawa, Kamakura; Fumiyoshi Akiyama, Yokohama, all of Japan

[73] Assignee: Hitachi, Ltd., Tokyo, Japan

[21] Appl. No.: 771,313

[22] Filed: Dec. 20, 1996

[30] Foreign Application Priority Data

Dec. 25, 1995 [JP] Japan .................................. 07-336961

[51] Int. Cl.$^6$ ...................................................... H04N 7/01
[52] U.S. Cl. ........................... 348/458; 348/445; 348/441; 348/448
[58] Field of Search ..................................... 348/445, 441, 348/448, 458, 552; 345/132, 523

[56] References Cited

U.S. PATENT DOCUMENTS 4,872,054 10/1989 Gray et al. ................................ 348/441
5,208,669 5/1993 Richards .................................. 348/445
5,218,436 6/1993 Sugiyama et al. ....................... 348/445

FOREIGN PATENT DOCUMENTS

A-7-123368 5/1995 Japan .

Primary Examiner—Victor R. Kostak
Attorney, Agent, or Firm—Frohwitter

[57] ABSTRACT

The present invention aims at providing an image display apparatus capable of displaying both a television signal and an image signal supplied from a personal computer with a high picture quality on a high definition display unit having 1024 by 768 pixels. In order to achieve this object, an image display apparatus according to the present invention includes an NTSC-VGA conversion circuit for converting a television signal to a signal having 640 by 480 pixels and corresponding to the non-interlacing VGA standard, a switch unit for selecting and outputting either the signal outputted from the NTSC-VGA conversion circuit and an inputted image signal from a personal computer, and a VGA-XGA conversion circuit for converting a number of pixels of a signal outputted from the switch unit to a number of pixels 1024 by 768 substantially equivalent to the number of the display unit.

10 Claims, 5 Drawing Sheets

IMAGE DISPLAY APPARATUS CAPABLE OF DISPLAYING PERSONAL COMPUTER SIGNALS AND TELEVISION SIGNAL BY CONVERSION INTO A SIGNAL OF A HIGHER NUMBER OF PIXELS

BACKGROUND OF THE INVENTION

The present invention relates to an image display apparatus capable of displaying images in common for image information signals of different signal forms supplied from various different image sources such as television signals and image signals supplied from personal computers.

In recent years, attention is paid to image display apparatuses of so-called multimedia type adapted to be able to display image information signals supplied from different image sources such as television signals and signals supplied from personal computers.

In an example thereof, it is attempted to display an image supplied from a personal computer on a television set widely spread in ordinary homes. When this television set corresponds to the NTSC system in this case, an image information signal from the personal computer is converted into video signals of the NTSC system and then supplied to the television set. A system in which image an information signal fed from a personal computer is supplied to a television set to display the images thereon is described in JP-A-7-123368, for example.

In another example, a received television program is displayed on a display apparatus dedicated to a personal computer.

SUMMARY OF THE INVENTION

In the case where images supplied from a personal computer are displayed on a television set, the picture quality of the displayed images is restricted by the number of pixels of the television set. In the case of a television set of the NTSC system, one frame has two fields and an interlacing system of 2:1 is adopted. The number of pixels on the screen of one frame is 640 (horizontal) by 480 (vertical). As for the output image information signal of the personal computers, there are different signal forms, such as the non-interlacing VGA signal form with 640 by 480 pixels, the SVGA form with 800 by 600 pixels, and the XGA form with 1024 by 768 pixels. Therefore, when an image signal supplied from a personal computer corresponding to the SVGA or the XGA form is displayed on a television set of the NTSC system, the picture quality is significantly degraded and the original high picture quality is not exhibited.

An object of the present invention is to provide an image display apparatus free from the above described problem and capable of displaying images supplied from an image source with a high picture quality irrespective of the kind (i.e., the signal form of the image information signal) of the image source.

In accordance with the present invention, the above described object is achieved by using a display unit having a larger number of pixels than the input image information signal, converting the input image information signal to a signal having a signal form associated with the display unit, and displaying a resultant image on the display unit.

Specifically, in accordance with the present invention, an image display apparatus receiving a first image information signal and a second image information signal having a larger number of pixels per screen than the first image information signal and capable of displaying an image for each of the first and second image information signals includes a display unit having a number of pixels larger than the number of pixels of the second image information signal, a first signal conversion circuit for converting the number of pixels of the first image information signal to a number of pixels substantially equivalent to the number of pixels of the second image information signal, a switch unit for selecting and outputting either the image information signal converted in number of pixels by the first signal converson circuit or the inputted second image information signal, and a second signal conversion circuit for converting a number of pixels of an image information signal outputted from the switch unit to a number of pixels substantially equivalent to the number of the display unit.

More specifically, in accordance with the present invention, an image display apparatus receiving as inputs a television signal of the NTSC system and an image information signal having 640 by 480 pixels and corresponding to the non-interlacing VGA standard outputted from a personal computer and capable of displaying an image for each of the television signal and the image information signal includes a display unit having 1024 by 768 pixels and corresponding to the non-interlacing XGA standard, an NTSC-VGA conversion circuit for converting the television signal to a signal having 640 by 480 pixels and corresponding to the non-interlacing VGA standard, a switch unit for selecting and outputting either the signal outputted from the NTSC-VGA conversion circuit and the inputted image information signal, and a VGA-XGA conversion circuit for converting a number of pixels of a signal outputted from the switch unit to a number of pixels 1024 by 768 substantially equivalent to the number of the display unit.

As a result, the television signal and the image information signal supplied from the personal computer can be displayed on the display unit with a number of pixels nearly equal to the number of pixels possessed by the display unit. For each image information signal, an image with a high picture quality is thus obtained.

DESCRIPTION OF THE PREFERRED EMBODIMENTS

Figure 1:
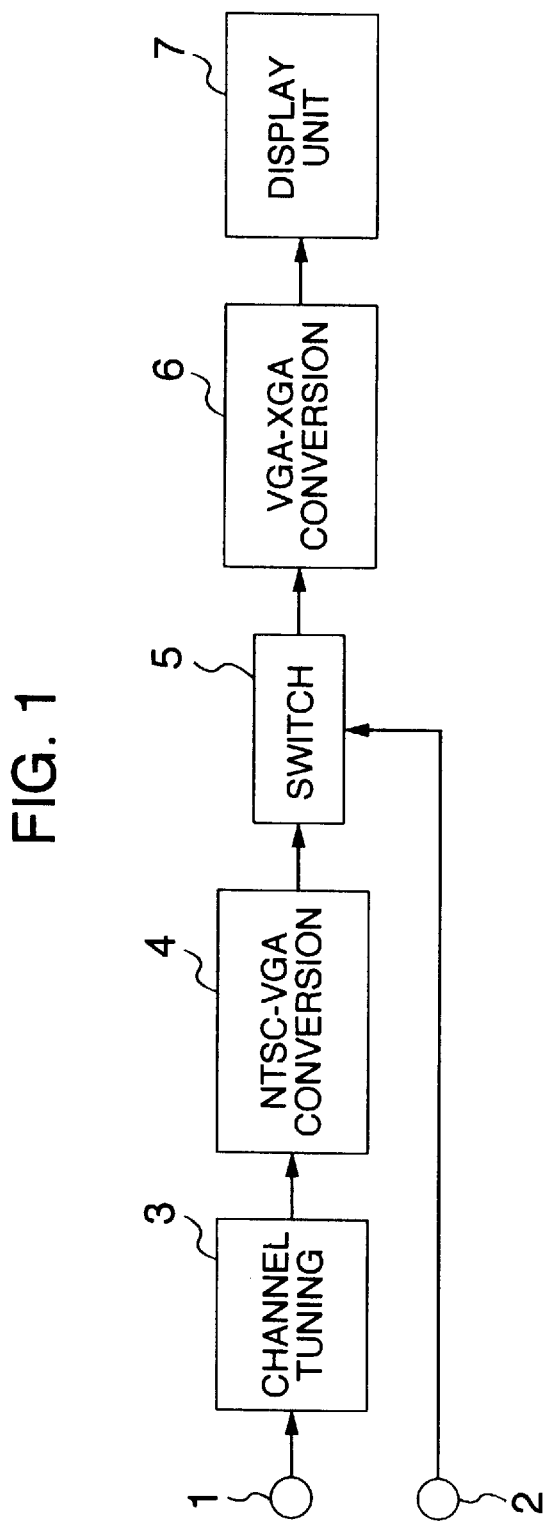
FIG. 1 is a block diagram showing an implementation form of an image display apparatus according to the present invention.

Hereafter, implementation forms of the present invention will be described by referring to the drawing. FIG. 1 is a block diagram showing an implementation form of an image display apparatus according to the present invention. Numerals 1 and 2 denote input terminals. Numeral 3 denotes a channel tuning unit, and numeral 4 denotes an NTSC-VGA conversion circuit. Numeral 5 denotes a changeover switch, and numeral 6 denotes a VGA-XGA conversion circuit. Numeral 7 denotes a display unit.

In FIG. 1, the display unit 7 is a TFT liquid crystal panel or a cathode-ray tube, for example. The display unit 7 is a display unit having a larger number of pixels than that corresponding to the NTSC system and capable of displaying images with a high picture quality, such as a TFT liquid crystal panel corresponding to the XGA. It is now assumed that the display unit 7 is a display unit conforming to the XGA form with 1024 by 768 pixels.

From the input terminal 1, broadcast television signals of respective channels are inputted. The broadcast television signal of a desired channel is selected by the channel tuning unit 3. It is now assumed that this broadcast television signal is a television signal of the NTSC system which is one of standard television systems (a composite signal with the 2:1 interlacing of 525/30 and a horizontal frequency of 15.734 kHz which is hereafter referred to as NTSC signal).

The NTSC signal of the desired channel outputted from the channel tuning unit 3 is supplied to the NTSC-VGA conversion circuit 4 for converting the signal form and converted to a video signal of the VGA form with non-interlacing of 525/60 and a horizontal frequency of 31.5 kHz which is twice that of the NTSC system.

On the other hand, an image information signal having a signal form VGA, SVGA or XGA is inputted from a personal computer which is not illustrated via the input terminal 2. The changeover switch 5 is controlled to be changed over under a user's instruction. Either the output image information signal supplied from the personal computer via the input terminal 2 or the video signal of the VGA form supplied from the NTSC-VGA conversion circuit 4 can be selected by the changeover switch 5.

The output image information signal of the personal computer or the video signal of the VGA form selected by the changeover switch 5 (hereafter generally referred to as image information signal) is supplied to the VGA-XGA conversion circuit 6 for converting the signal form. In the case where the supplied image information signal has a signal form other than the XGA, such as the VGA or SVGA, the signal is converted to an image information signal of the XGA form by the VGA-XGA conversion circuit 6 and then supplied to the display unit 7. In the case where the supplied image information signal is an image information signal of the XGA form, it is supplied to the display unit 7 as it is. Both the video image of the television signal of the NTSC system received by the channel tuning unit 3 and the image of the output image information signal of the personal computer of the VGA form or the SVGA form inputted from the input terminal 2 are displayed with the number of pixels (1024 by 768) conforming to the display unit 7 corresponding to the XGA. The image of the output image information signal of a personal computer corresponding to the XGA inputted from the input terminal 2 is also displayed in the same way. Therefore, any of these images is displayed with a possible picture quality in the display unit 7.

Figure 2:
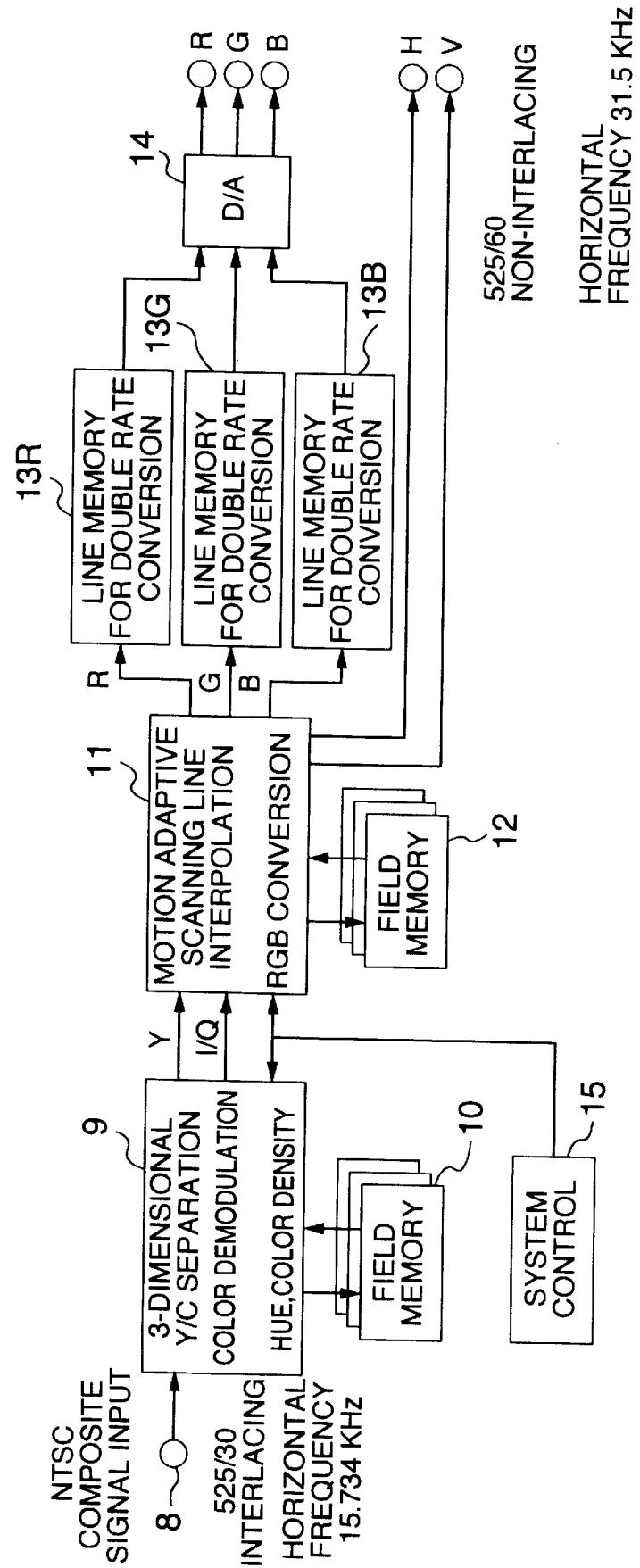
FIG. 2 is a block diagram showing a concrete example of an NTSC-VGA conversion circuit illustrated in FIG. 1.

FIG. 2 is a block diagram showing a concrete example of the NTSC-VGA conversion circuit illustrated in FIG. 1. Numeral 8 denotes an input terminal. Numeral 9 denotes a signal processing circuit including a three-dimensional Y/C separation circuit, a color demodulation circuit, and a color adjustment circuit. Numeral 10 denotes a field memory. Numeral 11 denotes a signal conversion circuit including a motion adaptive scanning line interpolation circuit and an RGB conversion circuit. Numeral 12 denotes a field memory, and 13R, 13G and 13B denote line memories for double rate conversion. Numeral 14 denotes a D/A conversion circuit. Numeral 15 denotes a system controller.

In FIG. 2, the above described NTSC signal inputted from the input terminal 8 is supplied to the signal processing circuit 9. In this signal processing circuit 9, this NTSC signal is converted to a digital signal and then separated into a luminance signal and a carrier chrominance signal by the three-dimensional Y/C separation circuit by using the field memory 10. This carrier chrominance signal is demodulated to chromaticity signals I and Q by the color demodulation circuit. In this case, these chromaticity signals I and Q are controlled by the system controller 15. Thereby, the hue and the color density are adjusted.

The luminance signal Y and the chromaticity signals I and Q outputted from the signal processing circuit 9 are supplied to the signal conversion circuit 11. In conjunction with the line memories for double rate conversion 13R, 13G and 13B, the signal conversion circuit 11 generates primary color signals R, G and B corresponding to the VGA from the luminance signal Y and the chromaticity signals I and Q of the NTSC system.

In order to generate interpolation horizontal scanning lines for achieving the 520/60 non-interlacing for each of the luminance signal Y and the chromaticity signals I and Q, interfield interpolation processing is conducted while incorporating the detected motion value by the motion adaptive scanning line interpolation circuit in the signal conversion circuit 11 by using the field memory 12. For each of the original horizontal scanning lines and the generated interpolation horizontal scanning line, the luminance signal Y and the chromaticity signals I and Q are subjected to computation processing to generate the primary color signals R, G and B. These primary color signals R, G and B are respectively written into the line memories 13R, 13G and 13B for double rate conversion in the order of sequenced horizontal scanning lines (including the interpolation horizontal scanning lines). The primary color signals are read out with a rate which is twice that of writing. Each horizontal scanning line is thus compressed on time axis as compared with the NTSC system.

As described above, the above described signal of each of the inputted horizontal scanning lines is used for interfield interpolation processing. In addition, the signal of each of the inputted horizontal scanning lines is temporarily written into the field memory 12. The signals of the interpolation horizontal scanning lines generated as described above are also written into the field memory 12. These horizontal scanning lines (including the interpolation horizontal scanning lines) are read out from the field memory 12 in the order required for screen configuration and supplied to the line memories for double rate conversion 13R, 13G and 13B. Each of the line memories for double rate conversion 13R, 13G and 13B has two line memories (provisionally referred to as A and B). If the primary signals corresponding to one horizontal scanning line are written into the line memories A and B, they are read out with a rate equivalent to twice that of writing. The write operation of the line memories A and B is deviated from the read operation by a period of time equivalent to half of one horizontal scanning period of the written primary signals. From the line memory 13R for double rate conversion, therefore, the primary signal R of each horizontal scanning line compressed to a half on time axis is obtained continuously. As for the line memories 13G and 13B for double rate conversion, the same holds true.

The primary signals R, G and B compressed on time axis and outputted from the line memories for double rate conversion 13R, 13G and 13B are converted to analog signals by the D/A conversion circuit 14. As a result, the primary signals R, G and B of 525/60 non-interlacing with a period of horizontal scanning line equivalent to 31.5 kHz are obtained. They are component signals of the VGA form having 640 by 480 pixels.

In the signal conversion circuit 11, a synchronization signal is separated from the inputted luminance signal Y. From this separated synchronization signal, a non-interlacing vertical synchronization signal V of 60 Hz and a horizontal synchronization signal H of 31.5 kHz synchronized to the component signal of the VGA form are generated.

Figure 3A:
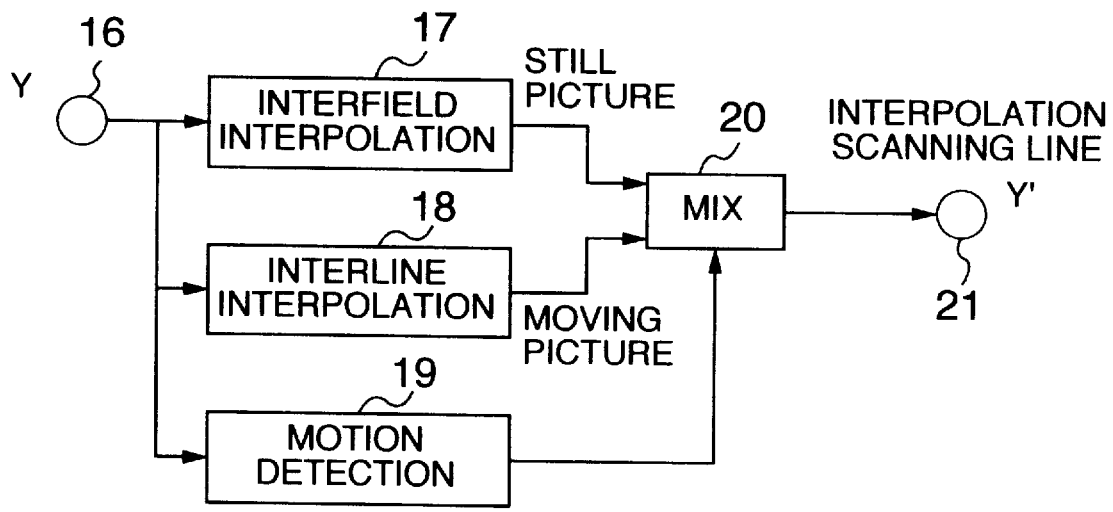
FIGS. 3A and 3B are block diagrams showing a concrete example of a motion adaptive scanning line interpolation circuit included in the signal conversion circuit illustrated in FIG. 2.

FIG. 3A is a block diagram showing a concrete example of the motion adaptive scanning line interpolation circuit in the signal conversion circuit 11 illustrated in FIG. 2 by taking the luminance signal Y as an example. Numeral 16 denotes an input terminal. Numeral 17 denotes an interfield interpolation circuit, and numeral 18 denotes an interline interpolation circuit. Numeral 19 denotes a motion detection circuit, and numeral 20 denotes a mixing circuit. Numeral 21 denotes an output terminal.

Figure 3B:
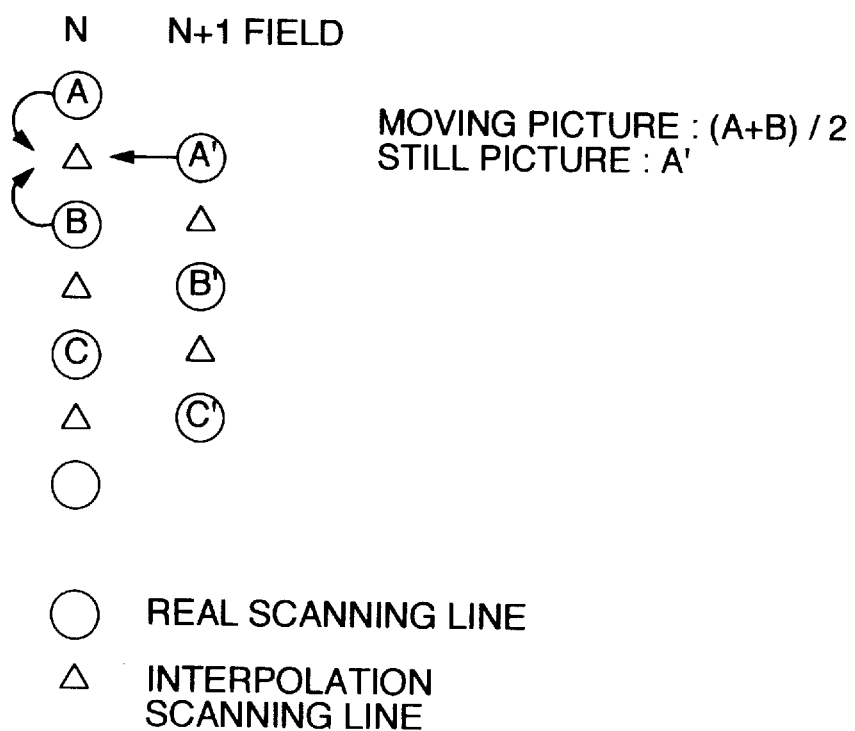

FIG. 3B is a diagram showing the operation of this concrete example.

With reference to FIG. 3A, the output luminance signal Y supplied from the signal processing circuit 9 (FIG. 2) is inputted via the input terminal 16 and supplied to the interfield interpolation circuit 17, the interline interpolation circuit 18, and the motion detection circuit 19. The motion detection circuit detects a motion portion of the video image and its speed from the input luminance signal Y. According to a result of this detection, the motion detection circuit controls the mixing circuit 20 to change a mixing ratio between the output luminance signal of the interfield interpolation circuit 17 and the output luminance signal o the interline interpolation circuit 18. In still portions of the video image, only the output luminance signal of the interfield interpolation circuit is passed through the mixing circuit 20. In a motion portion of the video image, the mixing ratio of the output luminance signal of the interline interpolation circuit 18 becomes larger as the motion becomes faster.

In the case of interlacing of 2:1, it is now assumed that horizontal scanning lines of the N-th field N are A, B, C, . . . in the order and horizontal scanning lines of the (N+1)-th field (N+1) are A', B', C', . . . in the order as shown in FIG. 3B. Then on the screen, the horizontal scanning line A' is displayed between the horizontal scanning lines A and B. The horizontal scanning line B' is displayed between the horizontal scanning lines B and C.

Every two consecutive fields N and N+1, the interfield interpolation circuit 17 uses, as interpolation horizontal scanning lines between two adjacent horizontal scanning lines of the preceding field N, horizontal scanning lines of the succeeding field (N+1) to be displayed between the horizontal scanning lines by means of interlacing. As interpolation horizontal scanning lines between the horizontal scanning lines A and B, between the horizontal scanning lines B and C, . . . of the field N, the horizontal scanning lines A', B', . . . of the next field (N+1) are used in FIG. 3B. Owing to the interpolation processing in the still portion, a high resolution can be maintained in this portion at the time of conversion from interlacing to non-interlacing without impairing the contour portion.

The interline interpolation circuit 18 functions to generate signals of interpolation horizontal scanning lines in the field.

By taking the field N as an example in FIG. 3B, the signal of the interpolation horizontal scanning line between the horizontal scanning lines A and B is derived from the horizontal scanning lines A and B as, for example, the average (A+B)/2 of successive pixels of the signals of the horizontal scanning lines A and B. In the motion portion, contents of images differ from field to field. Therefore, video images with smooth motion are obtained by effecting interline interpolation rather than the interfield interpolation.

In the NTSC-VGA conversion circuit 4 illustrated in FIG. 2, conversion from the NTSC system to the VGA form can be conducted without impairing the picture quality as heretofore described.

Figure 4:
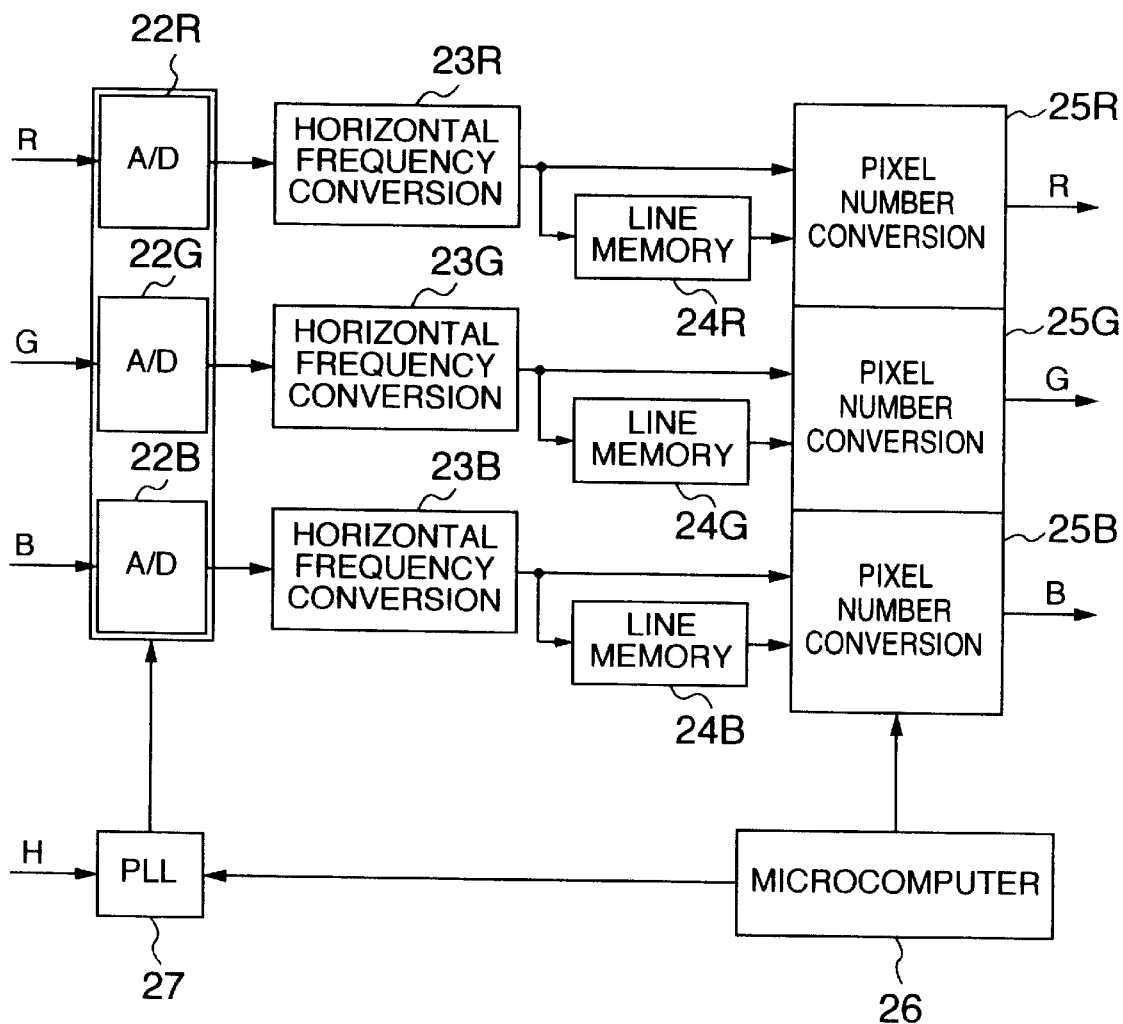
FIG. 4 is a block diagram showing a concrete example of a VGA-XGA conversion circuit illustrated in FIG. 1.

FIG. 4 is a block diagram showing a concrete example of the VGA-XGA conversion circuit illustrated in FIG. 1. In FIG. 4, 22R 22G and 22B denote A/D conversion circuits and 23R, 23G and 23B denote horizontal frequency conversion circuits. Furthermore, 24R, 24G and 24B denote line memories and 25R, 25G and 25B denote pixel number conversion circuits. Numeral 26 denotes a microcomputer. Numeral 27 denotes a PLL (phase-locked loop).

With reference to FIG. 4, the primary color signals R, G and B fed from the changeover switch 5 (FIG. 1) are supplied respectively to the A/D conversion circuits 22R 22G and 22B and converted to digital signals by using a clock supplied from the PLL 27. This PLL operates in synchronism with a horizontal synchronizing signal H supplied together with the primary color signals R, G and B. Therefore, the PLL 27 is controlled by the microcomputer 26 depending upon the signal form of the inputted primary color signals R, G and B such as the VGA form, the SVGA form or the XGA form.

Subsequent processing is the same for the primary color signals R, G and B. Therefore, processing for the primary color signal R will be hereafter described.

A digital primary color signal R outputted from the A/D conversion circuit 22R is converted to a primary color signal R having a horizontal frequency of the XGA type by a horizontal frequency conversion circuit 23R. The horizontal frequency conversion circuit 23R includes line memories, for example. Although not illustrated, its writing is conducted with a rate according to the output clock of the PLL 27. Its reading is conducted according to the clock corresponding to the XGA. Therefore, the horizontal frequency is converted in the horizontal frequency conversion circuit 23R in the case where the video signal of the VGA form converted by the NTSC-VGA conversion circuit 4 (FIG. 1) or an output image information signal of a personal computer having a signal form other than the XGA such as the VGA or SVGA is inputted. However, conversion of the horizontal frequency is not conducted in the case where an output image information signal of a personal computer having the XGA form is inputted.

If the horizontal frequency in the VGA form (31.5 kHz) is converted to the horizontal frequency in the XGA form (48.4 kHz), the horizontal scanning lines are compressed on the time axis by approximately ⅔ times. If the horizontal frequency in the SVGA form (37.9 kHz) is converted to the horizontal frequency in the XGA form, the horizontal scanning lines are compressed on the time axis by approximately ⅘ times.

The primary color signal R outputted from the horizontal frequency conversion circuit 23R is supplied to the display controller 25R. In addition, the primary color signal R outputted from the horizontal frequency conversion circuit 23R is delayed in the line memory 24R by one horizontal period of the image information signal of the XGA form and supplied to the display controller 25R. Th s display controller 25R functions to convert the number of pixels to that (1024 by 768) of the XGA form by using the primary color signal R supplied from the horizontal frequency conversion circuit 23R and the primary color signal R supplied from the line memory 24R. The primary color signal R processed by this display controller 25R is supplied to the display unit 7 illustrated in FIG. 1.

Figure 5A:
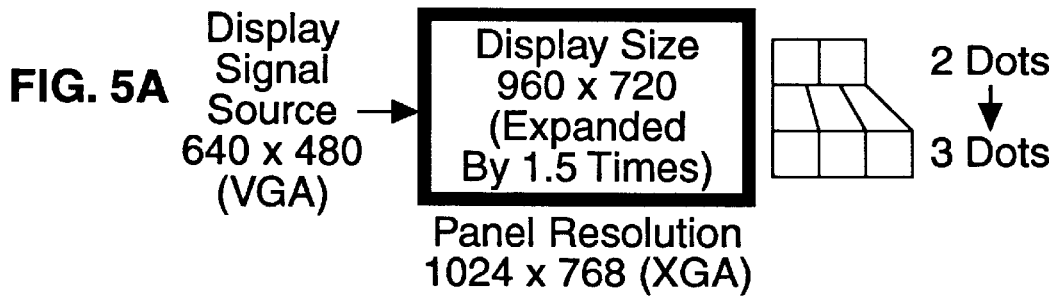
FIGS. 5A through 5C are schematic diagrams showing operation in the concrete example of the VGA-XGA conversion circuit illustrated in FIG. 4.

Assuming now that the primary color signal R inputted to the A/D conversion circuit 22R has the VGA form (640 by 480), each of the number of horizontal pixels and the number of vertical pixels is increased to 1.5 times to generate a primary color signal R close to the XGA form as shown in FIG. 5A. With respect to the primary color signal R supplied from the horizontal frequency conversion circuit 23R, two horizontal scanning lines are converted to three horizontal scanning lines by using the primary color signal R supplied from the horizontal frequency conversion circuit 23R. Furthermore, in each horizontal scanning line, two pixels are converted to three pixels.

For converting two horizontal scanning lines to three horizontal scanning lines, it is necessary to form an interpolation horizontal scanning line between the two horizontal scanning lines on the basis of the two scanning lines. It is now assumed that an output horizontal scanning line of the line memory 24R is LA and a horizontal scanning line outputted from the horizontal frequency conversion circuit 23R simultaneously with the LA is LB. (These horizontal scanning lines LA and LB are adjacent horizontal scanning lines before conversion. The horizontal scanning line LA precedes the horizontal scanning line LB.) The average of the primary color signal R between LA and LB is used as the primary color signal R of an interpolation horizontal scanning line LAB. Subsequently to the horizontal scanning line LA, this interpolation horizontal scanning line LAB is disposed. Subsequently to the interpolation horizontal scanning line LAB, the next horizontal scanning line LC supplied from the line memory 24R is disposed. As a matter of course, this horizontal scanning line LC is used to form the next interpolation horizontal scanning line.

Conversion of two pixels to three pixels on each horizontal scanning line can be accomplished by deriving an average pixel of two pixels of the horizontal scanning line and using the average pixel as interpolation between the two pixels.

Figure 5B:
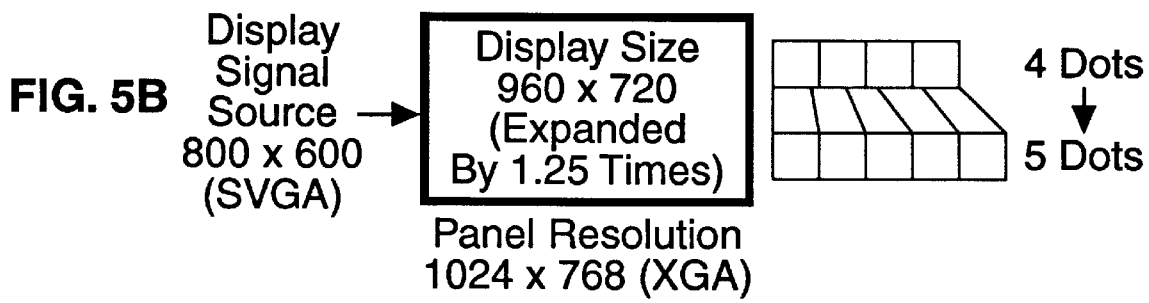

Assuming now that the primary color signal R inputted to the A/D conversion circuit 22R has the SVGA form (800 by 600), each of the number of horizontal pixels and the number of vertical pixels is increased to 1.25 times to generate a primary color signal R close to the XGA form as shown in FIG. 5B. With respect to the primary color signal R supplied from the horizontal frequency conversion circuit 23R, four horizontal scanning lines are converted to five horizontal scanning lines by using the primary color signal R supplied from the line memory 24R. Furthermore, in each horizontal scanning line, four pixels are converted to five pixels. For converting four horizontal scanning lines to five horizontal scanning lines, one horizontal scanning line is taken in from the horizontal frequency conversion circuit 23R each time four horizontal scanning lines are taken in from the line memory 24R. The one horizontal scanning line is disposed after the four horizontal scanning lines supplied from the line memory 24R.

Figure 6A:
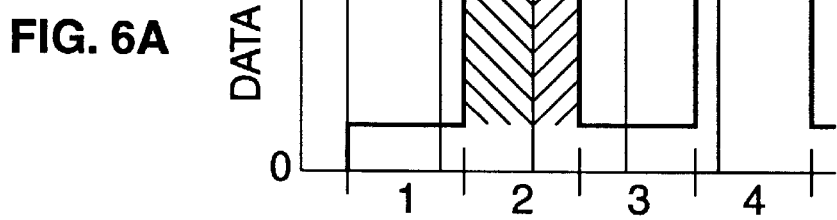
FIGS. 6A and 6B are diagrams showing operation for converting the number of pixels by using gradation integral in the concrete example of the VGA-XGA conversion circuit illustrated in FIG. 4.
Figure 6B:
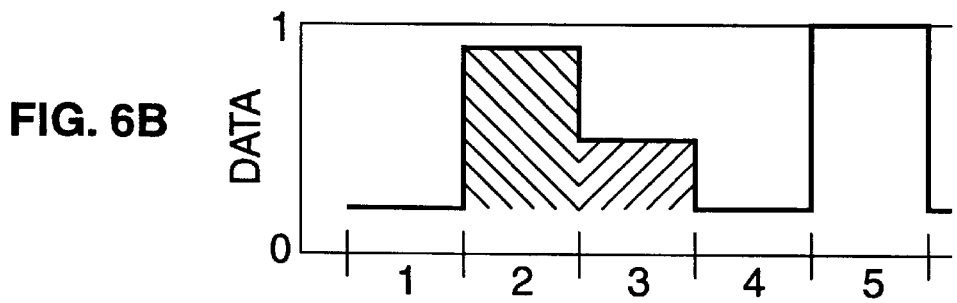

Conversion of four pixels to five pixels is conducted by the following method. Every four pixels, the last pixel of the four pixels is disposed again to form five pixels. In other words, the last two pixels have the same information contents. For further improving the precision, the gradation integral is used. As shown in FIG. 6A, the time range of four pixels are virtually divided into five time regions and the amount of data in each time region is derived. As shown in FIG. 6B, each time region is adopted as a pixel having the derived data amount.

Such a gradation integral method can be used to convert the number of pixels in the vertical direction by converting four horizontal scanning lines to five horizontal scanning lines. Whenever four horizontal scanning lines are taken in from the horizontal frequency conversion circuit 23R or the line memory 24R in this case, each pixel is divided into time regions as shown in FIG. 6A with respect to each scanning line. For example, the time range of each pixel of the first scanning line is divided with a ratio of 4:1 to produce a first time range having a proportion of $4/5$ and a second time range having a proportion of $1/5$. The preceding first time range having the proportion of $4/5$ of each pixel is adopted as a pixel having a data amount in the time range. A scanning line formed by these pixels is adopted as the first horizontal scanning line after conversion. The time range of each pixel of the second scanning line is divided with a ratio of 3:2 to produce a third time range having a proportion of $3/5$ and a fourth time range having a proportion of $2/5$. With respect to a corresponding pixel, the total of the second time range and the third time range is adopted as a pixel having a data amount of the total time range. A scanning line formed by these pixels is adopted as a second scanning line after conversion. Thereafter, third, fourth and fifth horizontal scanning lines are formed in the same way. This method is very complicated. However, distortion of displayed images can be sufficiently suppressed in conjunction with the conversion of the number of pixels in the horizontal direction using this gradation integral method for each horizontal scanning line.

Figure 5C:
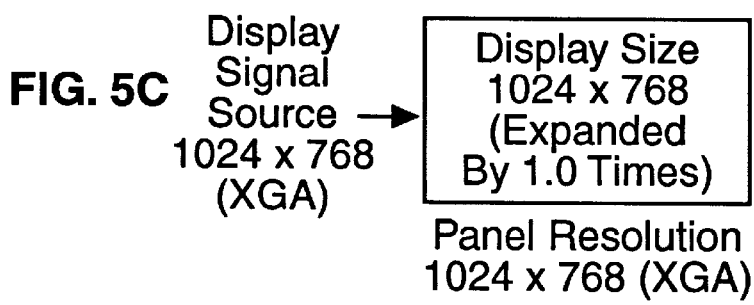

When the primary color signal R inputted to the A/D conversion circuit 22R has the XGA form, the horizontal frequency conversion circuit 23R does not conduct the horizontal frequency conversion operation and the display controller 25R does not conduct the pixel number conversion. The primary color signal R fed from the horizontal frequency conversion circuit 23R or the line memory 24R is supplied to the display unit 7 (FIG. 1) as it is. As shown in FIG. 5C, therefore, the image information signal having the XGA form supplied from the personal computer is displayed with its original number of pixels and display size.

As heretofore described, in this implementation form, a display unit corresponding to the XGA having a sufficiently large number of pixels and capable of displaying images of a high picture quality is used as the display unit 7 such as a TFT liquid crystal panel. A received video signal of a television program or an image information signal supplied from a personal computer is converted to a signal of the XGA form and displayed on the display unit 7. Therefore, the image displayed by using the image information signal of the XGA form is displayed with its greatest possible picture quality without impairing the picture quality. Furthermore, the received video signal of a television program or an image information signal of the VGA or SVGA form supplied from a personal computer is also displayed with a possible high picture quality on the above described display unit 7.

Furthermore, in this implementation form, the video signal of the NTSC system is converted to the video signal of the VGA form. Therefore, such a video signal can be processed as the output image information signal of the personal computer. The VGA-XGA conversion circuit can be used commonly for such a video signal as well.

While an implementation form of the present invention has heretofore been described, the present invention is not limited to such an implementation form.

For example, although the received television broadcast signal has been assumed to be an NTSC system television signal, it may be a television signal of another system. As for the image source, it is not limited to television broadcast signals or personal computers, but it may be another image information signal. In this case as well, a display unit of high picture quality such as a liquid crystal panel corresponding to the XGA is used and the image information signal of the image source is converted to an image information signal of a system corresponding to the display unit and then supplied to such a display unit.

In the above described implementation form, the video signal of the received television broadcast program is temporarily converted to an image information signal of the VGA form and then further converted to an image information signal of the XGA form. Alternatively, the video signal of the received television broadcast program may be directly converted to an image information signal of the XGA form. In this case, this conversion unit is dedicated to this video signal and its output and the output signal of the VGA-XGA conversion circuit 6 illustrated in FIG. 1 are switched and selectively supplied to the display unit 7. Furthermore, if a liquid crystal display device proposed by the present inventors in JP-A-6-160878 is used as the display unit of the image display apparatus described in the implementation form, images of high definition can be displayed with a high visual field angle.

As heretofore described, the present invention makes it possible to display image information signals having different signal forms supplied from image sources of different kinds as images by using the same display unit, display images with a possible picture quality of the display unit for any image information signal, and display images with approximately equal high picture qualities irrespective of the kind of these image sources.

The present invention can be implemented in forms other than the above described embodiment without departing from the spirit or principal features thereof. Therefore, the above described embodiment merely exhibits an example of the present invention in every respect and it should not be interpreted as restrictive. The scope of the present invention is defined by the claims. Variations and modifications belonging to the scope of the claims fall in the scope of the present invention.

We claim:

1. An image display apparatus receiving, as inputs thereof, a standard television signal and a PC signal outputted from a personal computer and capable of displaying an image for each of said standard television signal and PC signal, said image display apparatus comprising:

display means having a number of pixels larger than the number of pixels per screen of said PC signal and said television signal;

first signal conversion means for converting said inputted standard television signal to a signal format substantially equivalent to a signal format of said inputted PC signal;

switch means for selecting and outputting either the signal outputted from said first signal conversion means or said inputted PC signal; and second signal conversion means for converting a number of pixels of an image information signal outputted from said switch means to a signal having a number of pixels substantially equivalent to the number of said display means.

2. An image display apparatus receiving as inputs a television signal of the NTSC system and an image information signal having 640 by 480 pixels and corresponding to the non-interlacing VGA standard outputted from a personal computer and capable of displaying an image for each of said television signal and said image information signal, said image display apparatus comprising:

display means having 1024 by 768 pixels and corresponding to the non-interlacing XGA standard;

an NTSC-VGA conversion circuit for converting said television signal to a signal having 640 by 480 pixels and corresponding to the non-interlacing VGA standard;

switch means for selecting and outputting either the signal outputted from said NTSC-VGA conversion circuit and said inputted image information signal; and a VGA-XGA conversion circuit for converting a number of pixels of a signal outputted from said switch means to a number of pixels 1024 by 768 substantially equivalent to the number of said display means.

3. An image display apparatus according to claim 1, wherein said standard television signal is an NTSC system signal, and said PC signal is a non-interlacing VGA signal with 640 by 480 pixels per screen.

4. An image display apparatus according to claim 1, wherein said standard television signal is an NTSC system signal, and said PC signal is a non-interlacing SVGA signal with 800 by 600 pixels per screen.

5. An image display apparatus according to claim 1, wherein said display means has a pixel number of 1024 by 768.

6. An image display apparatus according to claim 1, wherein said display means has a pixel number of 800 by 600.

7. An image display apparatus according to claim 1, wherein said first signal conversion means converts inputted standard television signals into a signal corresponding to a non-interlacing VGA signal with 640 by 480 pixels per screen.

8. An image display apparatus according to claim 1, wherein said first signal conversion means converts said inputted standard television signal into a signal corresponding to a non-interlacing SVGA form with 800 by 600 pixels per screen.

9. An image display apparatus according to claim 1, wherein said second signal conversion means renders the number of pixels per screen of signal to be supplied to said display means close to the number of pixels of said display means by multiplying the number of pixels of each of the vertical and horizontal directions by 1.5 times when the number of pixels per screen of signal outputted from said switch means for selecting is 640 by 480 and the number of pixels of said display means is 1024 by 768.

10. An image display apparatus according to claim 1, wherein said second signal conversion means renders the number of pixels per screen of signal to be supplied to said display means close to the number of pixels of said display means by multiplying the number of pixels of each of the vertical and horizontal directions by 1.25 times when the number of pixels per screen of signal outputted from said switch means for selecting is 800 by 600 and the number of pixels of said display means is 1024 by 768.

* * * * *